(12) United States Patent
Liu et al.

(10) Patent No.: US 8,572,647 B2
(45) Date of Patent: Oct. 29, 2013

(54) ONLINE AD PLACEMENT BASED ON USER METRICS FOR HOSTED MEDIA

(75) Inventors: Matthew Cheng-Yu Liu, Fremont, CA (US); Shiva Littoo Rajaraman, San Francisco, CA (US); Jonathan Leigh Goldman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 898 days.

(21) Appl. No.: 12/407,627

(22) Filed: Mar. 19, 2009

(65) Prior Publication Data
US 2010/0242060 A1 Sep. 23, 2010

(51) Int. Cl.
*H04N 7/025* (2006.01)

(52) U.S. Cl.
USPC .............. 725/34; 725/35; 709/224

(58) Field of Classification Search
USPC .............. 725/32–36; 709/217–232
See application file for complete search history.

(56) References Cited

U.S. PATENT DOCUMENTS

| | | | |
|---|---|---|---|
| 6,698,020 B1* | 2/2004 | Zigmond et al. | 725/34 |
| 2005/0027594 A1* | 2/2005 | Yasnovsky et al. | 705/14 |
| 2006/0265368 A1* | 11/2006 | Nickerson et al. | 707/5 |
| 2007/0250901 A1* | 10/2007 | McIntire et al. | 725/146 |

OTHER PUBLICATIONS

PCT International Search Report and Written Opinion, PCT/US2010/027479, May 17, 2010, 10 pages.
Patent Examination Report No. 1 for Australian Patent Application No. 2010226779, May 9, 2013, 3 pages.

* cited by examiner

*Primary Examiner* — Annan Shang
(74) *Attorney, Agent, or Firm* — Fenwick & West LLP

(57) ABSTRACT

The present invention provides methods for determining which ads to present to a user. An embodiment of the method comprises identifying one or more ads, at least one of the identified ads associated with a video. For each identified ad, a first score is calculated. The first score for the identified ad associated with the video is calculated based on one or more metrics representing user interactions associated with viewing the video. In one embodiment, the score for the ad associated with the video will be better (e.g., higher) the more viewers of the video hosting service interact with the associated video, since such interactions thereby indicate a higher over level of viewer interest in the video. One or more of the identified ads are selected to be presented to the user based at least in part on the first score of each of the identified ads. The one or more selected ads are transmitted to a device for presenting to the user.

52 Claims, 5 Drawing Sheets

ONLINE AD PLACEMENT BASED ON USER METRICS FOR HOSTED MEDIA

BACKGROUND OF THE INVENTION

1. Field of the Invention

This invention pertains in general to using metrics of user access to online media assets associated with advertisements ("ads") to determine which ads to present to a user of a media hosting service.

2. Description of the Related Art

Video hosting services allow users to discover videos that are available over the Internet. A user is able to discover videos of interest by submitting a search query to a video hosting service or by browsing in the different categories of the video hosting service. Once a user finds a video of interest and selects a link to the video, the link directs the user to a webpage where the video is presented to the user.

On specific webpages, the video hosting service presents ads to the user. Each ad may be associated with a video; the ad may promote the video itself, a product or service of a sponsor of the video, a product of a service of an unrelated third party, another video, a website, or the like. For example, if a user submits a search query to the video hosting service, the video hosting service performs a search and presents to the user a webpage with search results. The webpage presented to the user may additionally include one or more ads. One problem with conventional methods is that the ads presented to users are often not of interest to users.

BRIEF SUMMARY OF THE INVENTION

The present invention provides methods for determining which ads to present to a user. An embodiment of the method comprises identifying one or more ads, at least one of the identified ads associated with a video. For each identified ad, a first score is calculated. The first score for the identified ad associated with the video is calculated based on one or more metrics representing user interactions associated with viewing the video. In one embodiment, the score for the ad associated with the video will be better (e.g., higher) the more viewers of the video hosting service interact with the associated video, since such interactions thereby indicate a higher over level of viewer interest in the video. One or more of the identified ads are selected to be presented to the user based at least in part on the first score of each of the identified ads. The one or more selected ads are transmitted to a device for presenting to the user.

In one embodiment, the first score calculated for each identified ad is an estimated cost per mille (eCPM). The eCPM is a function of a predicted click through rate (pCTR) and a cost per click (CPC) value associated with the ad. The pCTR for the ad is calculated based at least in part on one or more ad metrics. Responsive to the ad being the ad associated with the video, the pCTR is calculated based at least in part on the one or more ad metrics and a net interest score representing the overall interest of viewers who have viewed the video. In one embodiment, the net interest score is a combination of individual interest scores, where each interest score is determined after the video was accessed by a viewer. Each interest score calculated based on one or more access metrics determined from data collected while the video was accessed. In another embodiment, the net interest score is a function of one or more aggregate access metrics associated with the video.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5 is an example of a search results webpage including ads according to one embodiment.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
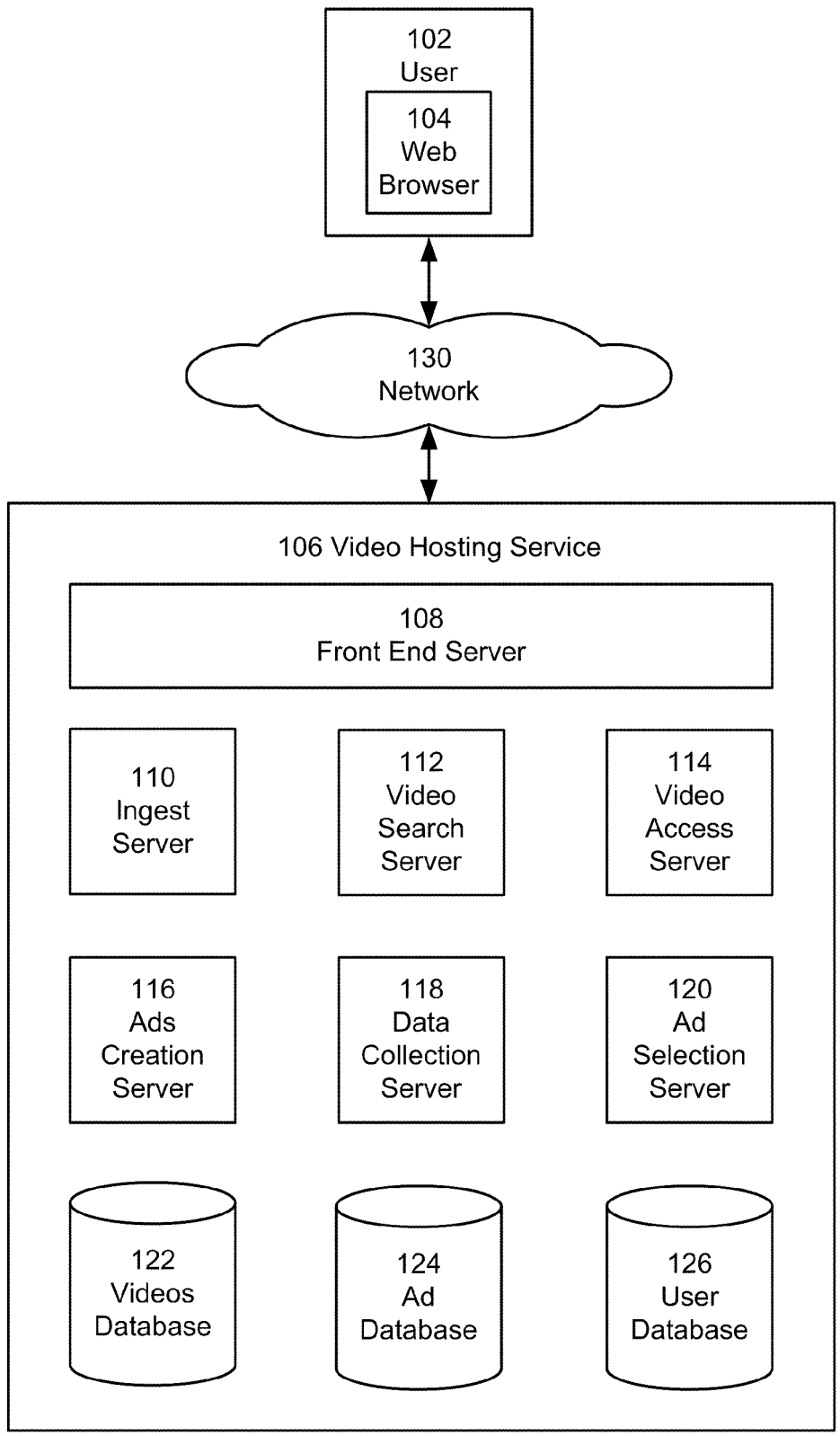
FIG. 1 is a high-level block diagram of the environment and system architecture of a video hosting service according to one embodiment.

FIG. 1 is a high-level block diagram of the environment 100 and system architecture of a video hosting service 106 according to one embodiment. FIG. 1 illustrates a video hosting service 106 and a user 102 connected by a network 130. The user represents an entity that can access videos included in the video hosting service 106. A user can access a video from the video hosting service 106 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting service 106 is adapted to receive videos for storage in order to enable the sharing of the videos with other users.

In one embodiment, the user uses a computer system to communicate with the video hosting service 106 over the network 130. In one embodiment, the video hosting service 106 is implemented at least in part using web-based technologies to support a website, in which case the user's computer system is a personal computer executing a web browser 104 such as MICROSOFT INTERNET EXPLORER or MOZILLA FIREFOX that allows the user to view webpages and videos provided by the video hosting service 106. In one embodiment, the web browser 104 includes a video player (e.g., Flash™ from Adobe Systems, Inc.). The user may utilize a network-capable device other than a computer system, such as a personal digital assistant (PDA), a cellular telephone, a pager, a television "set-top box" etc. Although FIG. 1 illustrates only a single user, it should be understood that many (e.g., millions) users can communicate with the video hosting service 106 at any time. The single user is illustrated in order to simplify and clarify the present description.

The network 130 represents the communication pathways between the user and the video hosting service 106. In one embodiment, the network 130 is the Internet, but may also be any network, including but not limited to a LAN, a MAN, a WAN, a mobile, wired or wireless network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Most generally, the video hosting service 106 represents any system that allows users to access video content via searching and/or browsing interfaces. The sources of videos can be from uploads of videos by users, searches or crawls of other websites or databases of videos, or the like, or any combination thereof. For example, in one embodiment, a video hosting service 106 can be configured to allow upload of content by users. In another embodiment, a video hosting service 106 can be configured to only obtain videos from other sources by crawling such sources or searching such sources in real time.

To simplify and clarify the present description, the content received and shared by the video hosting service 106 will be referred to as videos, video files, or video items, but it should be understood that the video hosting service 106 can receive and share content of any media type and file type. A suitable video hosting service 106 for implementation of the system is the YOUTUBE™ website; other video hosting services are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting service 106 includes a front end server 108, an ingest server 110, a video search server 112, a video access server 114, an ads creations server 116, a data collection server 118, an ad selection server 120, a videos database 122, an ad database 124, and a user database 126. Many conventional features, such as firewalls, load balancers, application servers, failover servers, site management tools and so forth are not shown so as not to obscure the features of the system.

Each of the various servers is implemented as a server program executing on a server-class computer comprising a CPU, memory, network interface, peripheral interfaces, and other well known components. The computers themselves preferably run an open-source operating system such as LINUX, have generally high performance CPUs, 1 G or more of memory, and 100 G or more of disk storage. Of course, other types of computers can be used, and it is expected that as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media).

The front end server 108 handles communication with the user via the network 130. The front end server 108 receives requests from users and communicates with the other servers of the video hosing service 106 to process the requests. For example, if a user requests to access a video, the front end server 108 makes sure that the proper servers process the request and that the video is transmitted to the user.

The ingest server 110 processes video files received by the front end server 108 from a user for posting to the video hosting service 106. In one embodiment, the processing of a video file received includes assigning a video identification (video ID) to the video file and storing the video file in a videos database 122. In one embodiment, the videos database 122 is a storage system that includes video files shared by the video hosting service 106 with users. Other steps that may be involved in the processing of the received video file before storing it in the videos database 122 include: formatting (e.g., transcoding), compressing, metadata tagging, content analysis, and/or other data processing methods.

In one embodiment, the front end server 108 receives a form with the video file received from the user. The form includes information entered by the user about the video, such as the title, description, and tag information. The form may additionally include information describing which users have administrative rights to the video file. In one embodiment, administrative rights allow a user to delete a video, edit information about the video, and associate the video with an ad. In one embodiment, a user may be given different levels of administrative rights. For example, a user may be given rights to associate a video with ads, but may not be given rights to delete the video from the videos database 122. The ingest server 110 stores the information included in the form as metadata of the video file in the videos database 122.

Additionally, the ingest server 110 updates data contained on the user that transmitted the video file to the video hosting service 106 in the user database 126. In one embodiment, the ingest server 110 stores the video ID assigned to the stored video file with the data of the respective user in the user database 126. The user database 126 includes data on users that communicate with the video hosting service 106. An example of data included in the user database 126 for a specific user includes the video IDs of video files transmitted by the user to the video hosting service 106 and the video IDs of video files that the user has accessed from the videos database 122 for viewing. In one embodiment, users are identified using a login name and password and/or by using the user's internet protocol address.

The video search server 112 processes any search queries received by the front end server 108 from users. A search query received by the front end server 108 from a user includes search criteria, such as keywords that may identify videos the user is interested in viewing. The video search server 112 uses the search criteria to query the metadata of video files stored in the videos database 122. The search results from the query are transmitted to the front end server 108 for presentation to the user. For example, if a user provides the front end server 108 with a keyword search query with the word "Lakers" the video search server 112 identifies videos stored in the videos database 122 related to the word "Lakers."

The video access server 114 processes requests from users ("viewers") to access certain videos. In one embodiment, the video access server 114 receives a request from a viewer to access a video when the viewer clicks on a link to the video. The request received from the viewer includes the video ID of the video the viewer wishes to access for viewing (this can be included automatically once the viewer clicks on the link for the video). The video access server 114 uses the video ID to search and locate the video in the videos database 122. Once the requested video is located, the video access server 114 transmits the video to the viewer with the help of the front end server 108. The video is presented to the viewer on a web page. Metadata associated with the video may also be presented with the video, such as the title and description of the video. In one embodiment, after transmitting the video to the viewer, the video access server 114 stores the video ID of the video transmitted to the viewer in the user database 126 with the data of the respective viewer.

The ads creation server 116 allows certain users (herein, "promoters") to create ads to present to users of the video hosting service 106. When the front end server 108 receives a request from a promoter to create an ad, the ads creation server 116 provides the promoter with one or more webpages that allow the promoter to describe the ad (e.g., appearance of the ad).

In one embodiment, on one of the webpages the promoter can select to associate a video with the ad. The ad may be for any product, service, website, content, whether of an entity affiliated with the video (e.g., a creator or sponsor of the video), or of another third party unaffiliated with the video. For example, a product demonstration video may be associated with an ad for a store at which the product is sold, or for a website where the product can be purchased, for another video showing other products by the same manufacturer, or for an unrelated product or service.

In one embodiment, the ads creation sever 116 allows the promoter to associate any video stored in the videos database 122 with the ad. In another embodiment, the promoter can only associate a video to which the promoter has administrative rights, such as those videos that the promoter has uploaded to the video hosting service 106, videos provided by the promoter's company, or the like.

In one embodiment, on one of the webpages the promoter enters an address (e.g., uniform resource locator) of a webpage to which a user is to be directed when a user clicks on the ad. If the ad is associated with a video, the promoter may enter the address of a webpage where the associated video can be viewed.

When the promoter is finished entering all information in the one or more webpages, the ads creation server 116 receives the information and uses the information to create the ad. The ads creation server 116 stores the created ad in the ad database 124. In one embodiment, the ad database 124 includes ads used by the video hosting service 106 for presentation to users. If the promoter selected to associate a video with the ad, the ads creation server 116 stores with the ad as metadata, the video ID of the associated video. Additionally, the ads creation server 116 uses the video ID to identify the video in the videos database 122. Once the video has been identified, the ads creation server 116 includes with the metadata of the video, information that indicates the video is associated with an ad.

The data collection server 118 collects information on videos associated with ads. When the video access server 114 retrieves a video from the videos database 122 to transmit the video to a viewer, the data collection server 118 determines based on the metadata of the video whether the video is associated with at least one ad stored in the ad database 124. If the video is associated with an ad, the data collection server 118 collects data on the interactions between the viewer and the webpage presenting the associated video to the viewer. In one embodiment, the interaction data collected by the data collection server 118 includes data on selections made and information entered (e.g., text comments) by the viewer on the webpage presenting the associated video.

In one embodiment, the data collection server 118 uses the collected data to determine appropriate access metrics for that instance of a viewer's access to the video. An access metric is a measurement of behavior and interactions performed by a viewer when accessing a video. Access metrics that may be determined by the data collection server 118 include: the amount of time the viewer viewed the video, the percentage of the video watched, whether a specific percentage of the video was watched, the number of times the viewer watched the video, the rating given to video by the viewer, whether the video was added as a favorite by the viewer, whether the video was shared by the viewer on a webpage or with another viewer, and whether the viewer provided a comment on the video. Additionally, if the viewer provides a comment on the video, the data collection server 118 can analyzes the content of the comment to determine whether the viewer provided positive, neutral, or negative feedback on the video; this can be done using sentiment detection methods. Comments can also include postings about the video made on wikis, forums, social networks, or other websites or online services.

The data collection server 118 uses the determined access metrics to calculate an interest score for a given user. The interest score represents the viewer's overall interest in the video for that instance of access to the video. For example, the data collection server 118 may calculate a low interest score for a video that was not completely viewed by a viewer and received a negative comment from the viewer. On the other hand, the data collection server 118 may calculate a high interest score for a video that was viewed multiple times by a viewer, received a positive comment from the viewer, and was added by the viewer as a favorite video.

In another embodiment, the data collection server 118 uses the collected data to update aggregate access metrics for the video. An aggregate access metric is an ongoing measurement of behavior and interactions performed by viewers when accessing a video. Aggregate access metrics are updated each time a viewer accesses the video. In one embodiment, an aggregate access metric that may be updated based on the collected data includes: the average amount of time the video is watched by viewers, the average percentage of the video watched, the number of times that a specific percentage of the was watched by viewers, the total number of times the video has been viewed by viewers, the average rating given to video by the viewers, the number of times the video has been added as a favorite by viewers, the number of times the video has been shared on webpages or with viewers, the total number of comments the video has received from viewers, the total number of positive comments the video has received, the total number of neutral comments the video has received, and the total number of negative comments the video has received. For example, assume the viewer adds a comment about the video while video is being viewed, the data collection server 118 determines based on the collected data that a comment was added and updates the total comment aggregate metric by one.

Periodically, the data collection server 118 calculates a net interest score for each video; the net interest score may also be called a global interest score. In one embodiment the data collection server 118 calculates the net interest score for a video based upon a combination of individual interest scores for the video. The net interest score represents the overall interest of viewers who have viewed the video. The net interest score can be an arithmetic mean of the individual interest scores, or a weighted average; for example more recent interest scores can be given a higher weight then less recent interest scores, which are down weighted. For example, interest scores from the most recent week can be given 100% weight, while older interest scores are given lesser weights, say 50%. The current value of the net interest score can also be based on one or more prior values of the net interest score, using one or more decay factors. The data collection server 118 stores the updated net interest score in the videos database 122 and associates the updated net interest score with the video.

In another embodiment, the data collection server 118 uses the aggregate access metrics for the video to calculate the net interest score for the video. In this embodiment, the net interest score is a function of the aggregate access metrics for the video. The net interest score can be an arithmetic mean of the aggregate access metrics or a weighted average. The system administrator designates how often the data collection server 118 updates the net interest score for the video. The data collection server 118 stores the updated net interest score in the videos database 122 and associates the updated net interest score with the video.

An ad selection server 120 determines which ads to present to a viewer. In one embodiment, the ad selection server 120 monitors for one or more specific events. When one of the specific events is detected the ad selection server 120 determines which ad or ads to present to a viewer. In one embodiment, the specific events that the ad selection server 120 monitors for are established by a system administrator. In one embodiment, the specific events monitored for, include: the video search server 112 receiving a search query from a viewer, the video access server 114 receiving a request from a viewer to access a video, and the front end server 108 receiving a request from a viewer to access a specific type of webpage (e.g., homepage of video hosting service 106). Any other event engaged in by a viewer can be the basis for presenting an ad.

When one of the specific events is detected, the ad selection server 120 identifies one or more search terms for querying the ad database 124. If the specific event detected is the video search server 112 receiving a search query from a viewer, the ad selection server 120 uses the search terms from the search query as the search terms for querying the ad database 124.

If the specific event detected is the video access server 114 receiving a request from a viewer to access a video, the ad selection server 120 scans the metadata of the requested video (e.g., title, description, tags) stored in the videos database 122 and identifies search terms for querying the ad database 124 from the metadata. In one embodiment, the words used as search terms are a set number of words that appear most often in the metadata of the video. If the specific event detected is the front end server 108 receiving a request from a viewer to access a specific type of webpage, the ad selection server 120 scans the content of the webpage requested and identifies search terms for querying the ad database 124 based on the content of the webpage. In one embodiment, the words used as search terms are a set number of words that appear most often in the content of the webpage. Alternatively, in either of the foregoing events (requested video, or accessed webpage) the selected words can be those that have the highest relevance within the context of the metadata or webpage, using an information retrieval score, such as TF-IDF, or the like.

Once the search terms have been identified, the ad selection server 120 uses the search terms to query the ad database 124 for ads whose metadata (e.g., content of ad, keywords associated with ad) matches one or more of the search terms. The result of the query is a result list that includes one or more ads. Each ad in the result list is preferably associated with a video, though in some cases an ad may not have an associated video. The ad selection server 120 calculates for each ad in the result list an estimated cost per mille (eCPM). The eCPM is an estimation of how profitable the ad will be. To calculate the eCPM for an ad, the ad selection server 120 uses a predicted click through rate (pCTR) and a cost per click (CPC) associated with the ad. The equation for calculating eCPM is as follows:

$$eCPM = pCTR * CPC$$

The pCTR is a score that represents the likelihood that if the ad is presented to a viewer, the viewer will click on the ad. The CPC is how much a promoter is willing to pay the video hosting service 106 every time the ad is clicked on by a viewer. In one embodiment, a promoter sets the CPC for the ad when the ad is created.

The pCTR is calculated by the ad selection server 120 using a number of factors, which may include ad metrics determined based on user interaction with the ad (e.g., the total number of times the ad has been presented to viewers and the total number of times the ad has been clicked on by viewers). If the ad is associated with a video, the ad selection server 120 retrieves the net interest score stored by the data collection server 118 in the videos database 122 for the associated video. The ad selection server 120 uses the net interest score of the associated video as one of the factors for calculating the pCTR for the ad. In one embodiment, the pCTR for the ad is equal to the net interest score.

Given that the net interest score is a measurement of the overall interest of viewers who have viewed the associated video, it is beneficial to use the net interest score in calculating the pCTR for the ad because the pCTR will then be a more accurate measurement as to the likelihood that a viewer will click on the ad. For example, assume that an ad promoting a new hit movie is associated with a video, the video being a preview for the hit movie. Additionally, assume that the video has a high net interest score because many viewers have watched and enjoyed the preview. When the pCTR is calculated using the net interest score of the associated video, the pCTR will accurately reflect that the chances of the ad being clicked on are high since many viewers are interested in the new hit movie. Thus, the pCTR will more than likely be high for ads associated with videos that users have a high interest in.

In one embodiment, if the ad is associated with a video, the ad selection server 120 additionally uses data related to the user that triggered the ad selection server 120 to detect the specific event (e.g., user submitting a request to access a video) to calculate the pCTR for the ad. In one embodiment, the user data used by the ad selection server 120 to calculate the pCTR for the ad includes using data stored in the user database 126 related to the videos the user has accessed and uploaded. The ad selection server 120 compares the metadata (e.g., title, description, tags) of the associated video to the metadata of each video the user has viewed and uploaded. For each comparison, the ad selection server 120 determines a comparison measurement that reflects the similarity between the associated video and the video viewed or uploaded by the user. The ad selection server 120 uses the multiple comparison measurements determined to calculate a net comparison measurement representing the overall similarity between the associated video and videos the user has viewed and uploaded. The net interest measurement can be, for example, an arithmetic mean of the multiple comparison measurements. The ad selection server 120 uses the net comparison measurement as one of the factors in calculating the pCTR for the ad.

Once the pCTR has been calculated for the ad, the ad selection server 120 uses the pCTR and the CPC to calculate the eCPM for the ad. The ad selection server 120 ranks the ads in the result list based on the eCPM calculated for each ad in the result list. In one embodiment, the ad selection server 120 selects a set number of the highest ranking ads in the result list to present to the viewer. In another embodiment, the ad selection server 120 selects ads in the result list having an eCPM above a set threshold as the ads to present to the viewer. The ad selection server 120 retrieves the selected ads from the ad database 124 and presents the ads to the viewer on a webpage corresponding to the viewer's request, such as a webpage including search results for a search query or a webpage presenting a video requested.

In one embodiment, instead of the ad selection server 120 calculating an eCPM for an ad when the ad is identified based on a query and is included in a result list, the ad selection server 120 periodically calculates and stores the eCPM for each ad in ad database 124. Therefore, when an ad is identified based on a query, instead of calculating the eCPM for the ad at that moment, the ad selection server 120 retrieves the last eCPM calculated for the ad FIG. 5 is an example of a search results webpage 500 including ads according to one embodiment. The webpage 500 comprises field 502, which includes a search query submitted by a user to the video search server 112. In this example, the user entered a search query of "movie." Below field 502 are search results 504 of videos identified by the video search server 112 as being relevant to the search query "movie." To the right of the search results 504, the webpage 500 includes ads 506, 508, and 510 selected by the ad selection server 120 to be presented to the user based on an eCPM calculated for each ad. Ad 510 is promoting a movie with a title of "W." It should be understood that in other embodiments the ad may promote other entities that are not a movie or video. The ad 510 is associated with a video that is a preview for the movie. In this example, if the user clicks on the ad 510, a webpage is presented to the user that plays the movie preview video associated with the ad.

Figure 2:
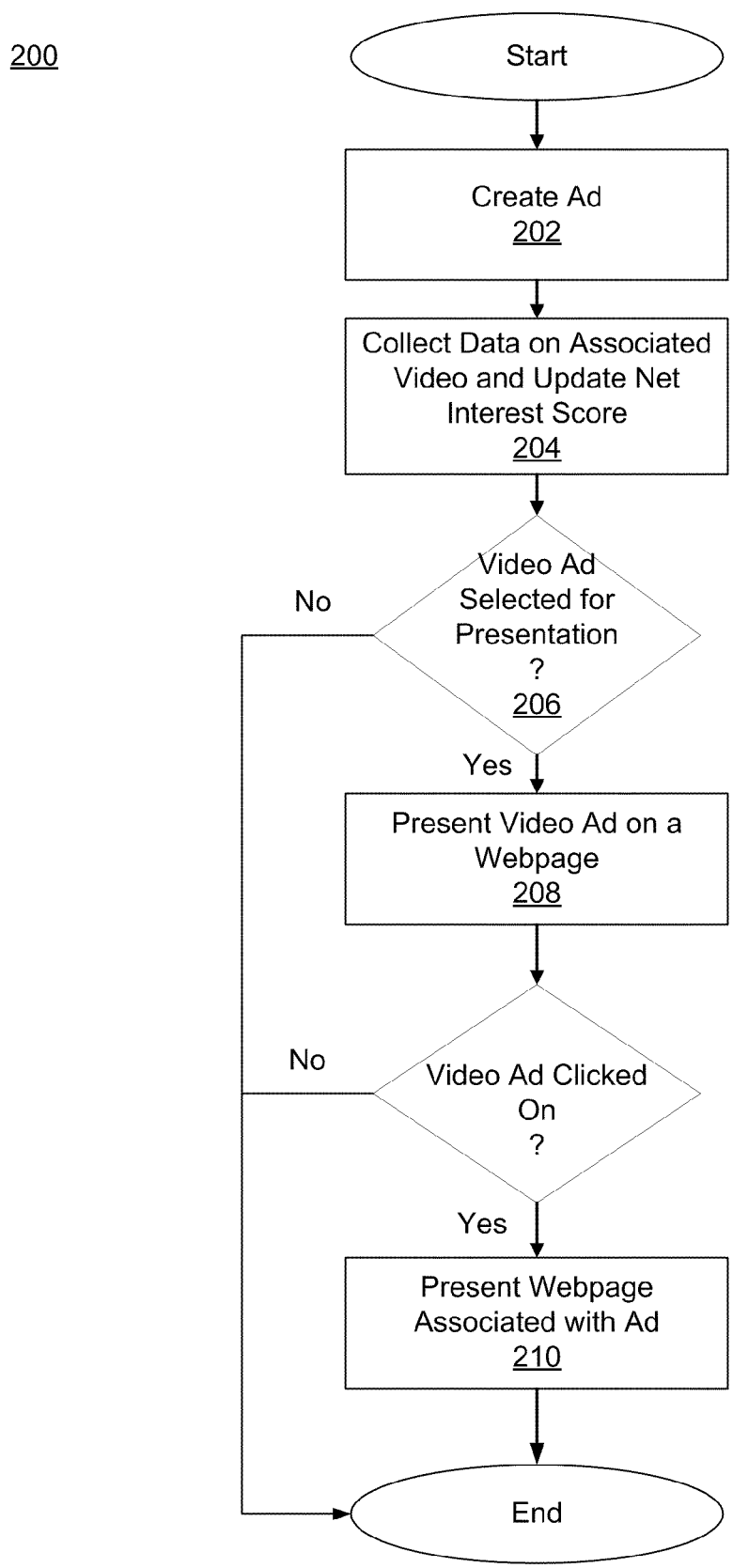
FIG. 2 is a flow chart illustrating the overall operations of the video hosting service in presenting an ad to a user according to one embodiment.

FIG. 2 is a flow chart 200 illustrating the overall operations of the video hosting service 106 in presenting an ad to a user according to one embodiment. Those of skill in the art will recognize that other embodiments can perform the steps of FIG. 2 in different orders, as the various steps shown here can be performed asynchronously. Moreover, other embodiments can include different and/or additional steps than the ones described here.

Assume for purposes of this example that a user has requested that the video hosting service 106 create an ad. In response the video hosting server provides the user with one or more webpages that allow the user to describe the ad. In a webpage the user selects to associate a video with the ad. In one embodiment, the video selected by the user to be associated with the ad is stored in the video hosting service 106. In another embodiment, the video is stored in a database coupled to video hosting service 106. Additionally, in a webpage, the user enters an address of a webpage to associate with the ad. When a user clicks on the ad, the user will be directed to the associated webpage. In one embodiment, the address entered by the user is of a webpage where the associated video can be viewed. Once the user is finished entering information in the one or more webpages, the video hosting service 106 receives the information entered by the user.

The video hosting service 106 uses the information provided by the user to create 202 an ad that is associated with the video selected by the user. Subsequently, when a user accesses and views the associated video on a webpage, the video hosting service 106 collects 204 data on the interactions between that user and the webpage where the associated video is presented to the user. The collected data is used by the video hosting service 106 to update a net interest score for the associated video, as described above. This step of collecting data and updating the net interest score for the associated video is repeated as the ad is accessed by various users.

Separately, when a specific event occurs, such as the video hosting service 106 receiving a search query, a determination 206 is made as to whether the ad should be selected to be presented to a user, based on the event and an eCPM score is calculated for the ad as described above. If the ad is selected, the ad is presented 208 to a user on a webpage. In one embodiment, the webpage is a search results webpage or a webpage where a video is presented to a user. If the user clicks on the ad, the user is presented 210 with the webpage associated with the ad.

Figure 3:
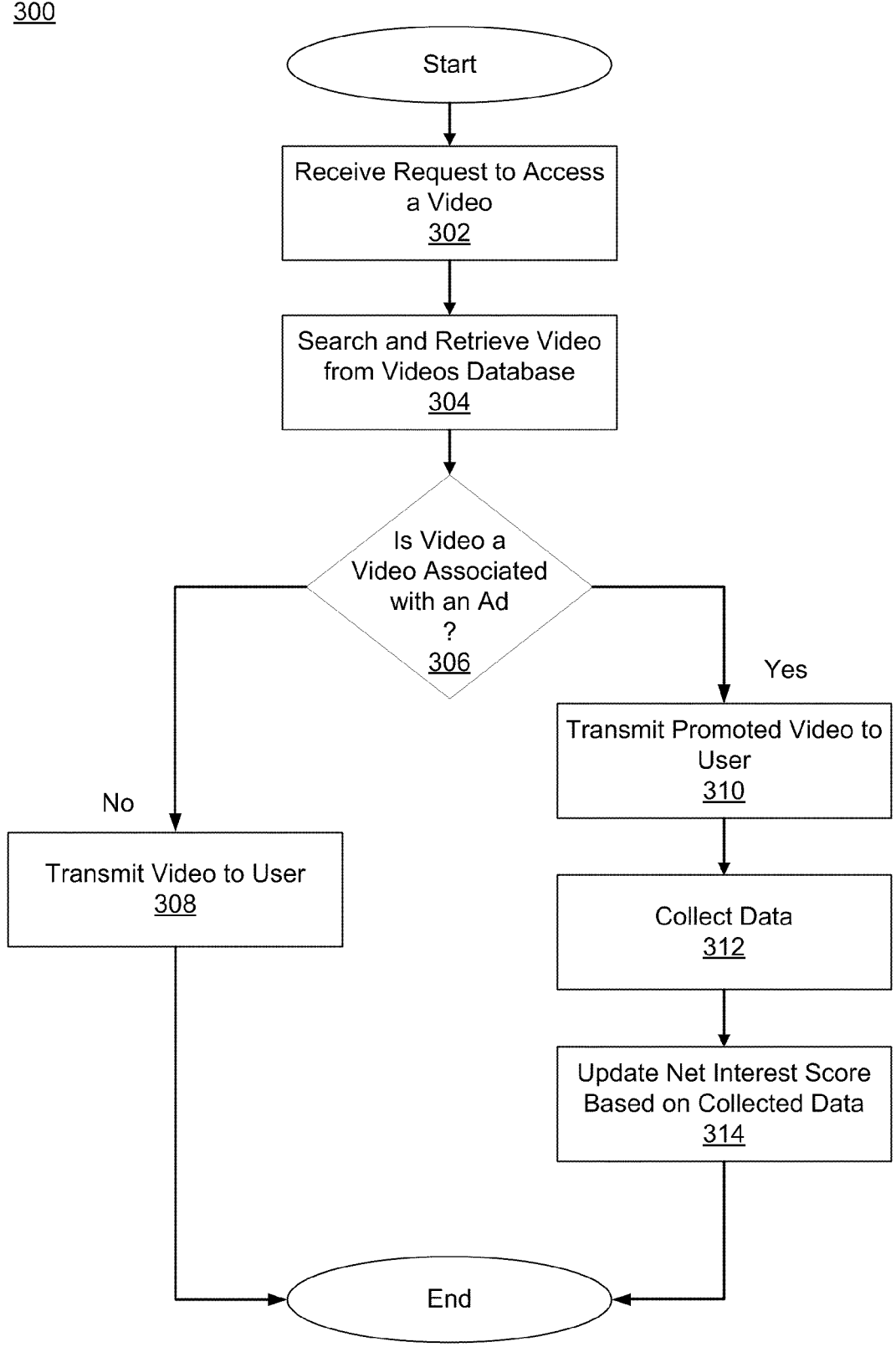
FIG. 3 is a flow chart illustrating the operations of the video hosting service in handling a request to access a video according to one embodiment.

FIG. 3 is a flow chart 300 illustrating the operations of the video hosting service 106 in handling a request to access a video according to one embodiment. Those of skill in the art will recognize that other embodiments can perform the steps of FIG. 3 in different orders, and the various steps shown here can be performed asynchronously. Moreover, other embodiments can include different and/or additional steps than the ones described here.

The video hosting service 106 receives 302 a request from a user to access a video. In response, the video hosting service 106 searches 304 for the video and retrieves the video from the videos database 122. Based on the metadata of the video a determination 306 is made as to whether the video is associated with an ad. If the video is not associated with an ad, the video is transmitted 308 and presented to the user on a webpage.

On the other hand, if the video is associated with an ad, the video is transmitted 310 to the user and presented on a webpage. The video hosting service 106 collects 312 the data on interactions between the user and the webpage presenting the video. In one embodiment, the video hosting service 106 only collects data on interactions between the user and a video player presenting the video. The video hosting service 106 uses the collected data to update 314 a net interest score associated with the video.

In one embodiment, the video hosting service 106 uses the collected data to update the net interest score by determining access metrics for the instance of access to the video. The access metrics are used to calculate an interest score for that instance of access to the video. The calculated interest score is used to update the net interest score. In another embodiment, the video hosting service 106 uses the collected data to update the net interest score by updating aggregate access metrics associated with the video. The updated aggregate access metrics are used to update the net interest score for the video. The updated net interest score is stored in the videos database 122.

Figure 4:
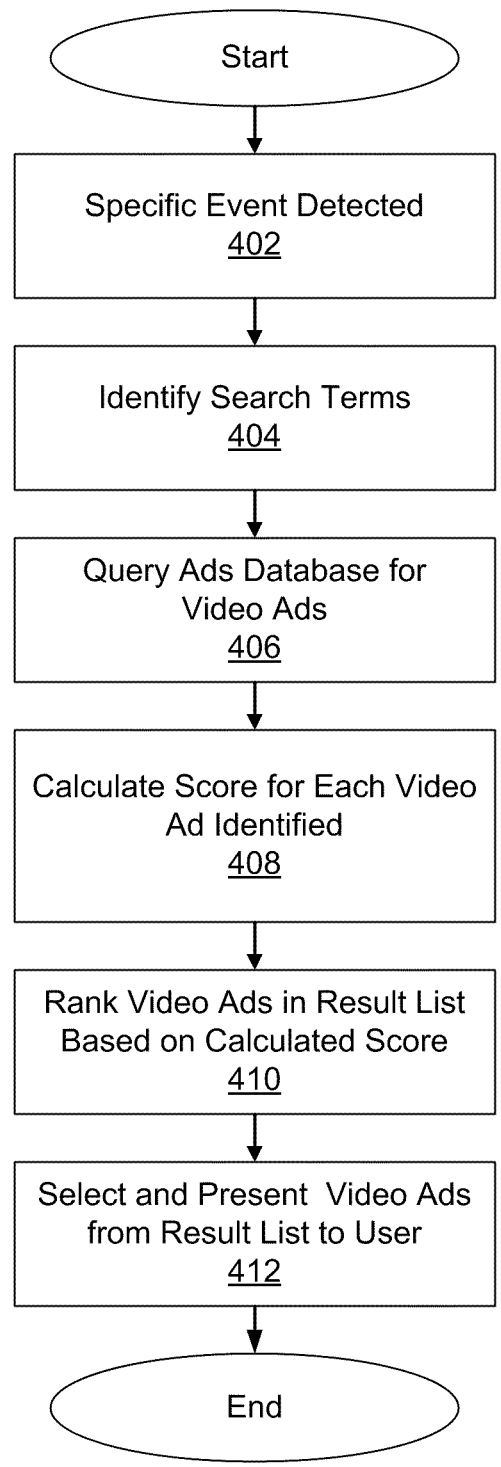
FIG. 4 is a flow chart illustrating the operations of the video hosting service in presenting one or more ads to a user according to one embodiment.

FIG. 4 is a flow chart 400 illustrating the operations of the video hosting service 106 in presenting one or more ads to a user according to one embodiment. Those of skill in the art will recognize that other embodiments can perform the steps of FIG. 4 in different orders, and the various steps shown here can be performed asynchronously. Moreover, other embodiments can include different and/or additional steps than the ones described here.

Assume for purposes of this example that a user is interacting with the video hosting service 106. The video hosting service 106 monitors the interactions for one or more specific events. During the interactions with the video hosting service 106 a specific event is detected 402, for example, the user submitting a search query to the video hosting service 106. Based on the detected event, the video hosting service 106 identifies 404 search terms for querying the ad database 124. The video hosting service 106 uses the identified search terms to query 406 the ad database for ads whose metadata is related to the search terms. The result of the query is a result list that includes one or more ads that are responsive to the query.

For each ad in the result list, the video hosting service 106 calculates 408 a score. In one embodiment, the score calculated for each ad is an eCPM. The eCPM is calculated using a pCTR calculated for the ad and a CPC associated with the ad. The pCTR is calculated using several factors, such as the number of times the ad has been presented to users and the total number of times the ad has been clicked on by users. If the ad is associated with a video, the net interest score of the associated video is retrieved and used as a factor for calculating the pCTR associated with the ad. In one embodiment, the pCTR is equal to the net interest score of the associated video.

The video hosting service 106 ranks 410 the one or more ads in the result list based on their respective score. A number of ads from the result list are selected 412 by the video hosting service for presenting to the user on a webpage. In one embodiment, a specific number of the top scoring ads in the result list are selected by the video hosting service 106. In another embodiment, ads from the result list having a score above a set threshold are selected by the video hosting service 106. The selected ads are retrieved from the ad database 124 and presented to the user, preferably in order of their ranking scores. The ads are presented on the webpage that the user is viewing so long as the user remains on the page.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer implemented method for determining which ads to present to a user, the method executed by a computer system and comprising:
   maintaining, by a computer system, a video score for a video, the video score maintained based on one or more metrics representing user interactions received by the computer system from users that have viewed the video;
   identifying, by the computer system, an ad that is a candidate for presentation to a user, the ad associated with the video;
   calculating, by the computer system, an ad score for the ad that represents a measurement of a likelihood that the user will be interested in the ad, the ad score calculated based at least in part on the video score of the video;
   choosing, by the computer system, to present the ad to the user based at least in part on the calculated ad score; and
   responsive to choosing to present the ad, transmitting, by the computer system, the ad to a device configured to present the ad to the user.

2. The computer implemented method of claim 1, wherein identifying the ad comprises:

monitoring user interactions with a video hosting service for an event; and responsive to detecting the event, identifying the ad based upon the detected event.

3. The computer implemented method of claim 2, wherein the event being monitored for is receiving a search query from the user.

4. The computer implemented method of claim 2, wherein the event being monitored for is receiving a request from the user to access a video.

5. The computer implemented method of claim 2, wherein the event being monitored for is receiving a request from the user to access a specific type of webpage.

6. The computer implemented method of claim 2, wherein identifying the ad based upon the detected event comprises:

identifying one or more search terms based at least in part on the detected event; and identifying the ad and additional ads based at least in part on the one or more search terms.

7. The computer implemented method of claim 6, wherein responsive to detecting the event of receiving a request from the user to access a requested video, identifying one or more search terms comprises:

scanning metadata of the requested video; and identifying the one or more search terms from words appearing in the metadata of the requested video.

8. The computer implemented method of claim 7, wherein the identified one or more search terms are a set number of words appearing frequently in the metadata of the requested video.

9. The computer implemented method of claim 7, wherein the identified one or more search terms are one or more words having a high relevance within the metadata of the requested video.

10. The computer implemented method of claim 6, wherein responsive to detecting the event of receiving a request from the user to access a specific type of webpage, identifying one or more search terms comprises:

scanning content of the requested webpage; and identifying the one or more search terms from words appearing in the webpage.

11. The computer implemented method of claim 10, wherein the identified one or more search terms are a set number of words appearing frequently in the webpage.

12. The computer implemented method of claim 10, wherein the identified one or more search terms are one or more words having a high relevance in the webpage.

13. The computer implemented method of claim 1, wherein the video score is calculated based on one or more interest scores, each interest score calculated based at least in part on one or more access metrics determined for an instance of access to the video.

14. The computer implemented method of claim 13, further comprising:

responsive to an additional user accessing the video, collecting interaction data on interactions between the additional user and an entity presenting the video;

determining based at least in part on the collected data, one or more access metrics for the instance of access to the video; and calculating an interest score based at least in part on the one or more access metrics.

15. The computer implemented method of claim 14, wherein the interaction data collected is data on selections made and information provided by the additional user to the entity presenting the video.

16. The computer implemented method of claim 14, wherein the entity presenting the video is a webpage.

17. The computer implemented method of claim 14, wherein the entity presenting the video is a video player.

18. The computer implemented method of claim 13, wherein an access metric is an amount of time the video was watched by the additional user.

19. The computer implemented method of claim 13, wherein an access metric is a percentage of the video watched by the additional user.

20. The computer implemented method of claim 13, wherein an access metric is based on whether a specific percentage of the video was watched by the additional user.

21. The computer implemented method of claim 13, wherein an access metric is a number of times the video was watched by the additional user.

22. The computer implemented method of claim 13, wherein an access metric is a rating given to the video by the additional user.

23. The computer implemented method of claim 13, wherein an access metric is based on whether the video was added as a favorite by the additional user.

24. The computer implemented method of claim 13, wherein an access metric is based on whether the video was shared on a webpage or with other users.

25. The computer implemented method of claim 13, wherein an access metric is based on whether a comment was provided by the additional user on the video.

26. The computer implemented method of claim 13, wherein an access metric is based on whether a comment provided by the additional user was a positive comment.

27. The computer implemented method of claim 13, wherein an access metric is based on whether a comment provided by the additional user was a neutral comment.

28. The computer implemented method of claim 13, wherein an access metric is based on whether a comment provided by the additional user was a negative comment.

29. The computer implemented method of claim 13, wherein the video score is a weighted combination of the one or more interest scores.

30. The computer implemented method of claim 13, wherein the video score is an average combination of the one or more interest scores.

31. The computer implemented method of claim 30, wherein an aggregate access metric is based on the number of times that a specific percentage of the video was watched by users.

32. The computer implemented method of claim 1, wherein calculating the ad score for the identified ad associated with the video comprises:

periodically updating the video score based at least in part on one or more aggregate access metrics, each aggregate access metric an ongoing measurement of user interactions associated with viewing the video; and calculating the ad score for the ad based at least in part on the video score.

33. The computer implemented method of claim 32, wherein updating the video score comprises:

responsive to an additional user accessing the video, collecting interaction data on interactions between the additional user and an entity presenting the video;

updating the one or more aggregate access metrics based at least in part on the collected data, and updating the video score based at least in part on the updated one or more aggregate access metrics.

34. The computer implemented method of claim 33, wherein the interaction data collected is data on selections made and information entered by the additional user in the entity presenting the video.

35. The computer implemented method of claim 33, wherein the entity presenting the video is a webpage.

36. The computer implemented method of claim 33, wherein the entity presenting the video is a video player.

37. The computer implemented method of claim 32, wherein an aggregate access metric is an average amount of time the video is watched by users.

38. The computer implemented method of claim 32, wherein an aggregate access metric is based on an average percentage of the video watched by users.

39. The computer implemented method of claim 32, wherein an aggregate access metric is based on a total number of times the video has been watched by users.

40. The computer implemented method of claim 32, wherein an aggregate access metric is based on an average rating given to the video by users.

41. The computer implemented method of claim 32, wherein an aggregate access metric is based on a total number of times the video was added as a favorite by users.

42. The computer implemented method of claim 32, wherein an aggregate access metric is based on the total number of times the video has been shared by users on webpages or with other users.

43. The computer implemented method of claim 32, wherein an aggregate access metric is based on the total number of comments the video has received from users.

44. The computer implemented method of claim 32, wherein an aggregate access metric is based on the total number of positive comments the video has received from users.

45. The computer implemented method of claim 32, wherein an aggregate access metric is based on the total number of neutral comments the video has received from users.

46. The computer implemented method of claim 32, wherein an aggregate access metric is based on the total number of negative comments the video has received from users.

47. The computer implemented method of claim 1, wherein the ad score calculated for the ad is an estimated cost per mille (eCPM) and wherein calculating the eCPM comprises:
   calculating a predicted click through rate (pCTR) for the ad based at least in part on one or more ad metrics and the video score; and
   calculating the eCPM based at least in part on the calculated pCTR and a cost per click (CPC) value associated with the ad.

48. The computer implemented method of claim 47, wherein an ad metric used in calculating the pCTR is the total number of times the ad has been clicked on by users.

49. The computer implemented method of claim 47, wherein an ad metric used in calculating the pCTR is the total number of times the ad has been presented to users.

50. The computer implemented method of claim 47, wherein the pCTR is a function of the one or more ad metrics, the video score, and a net comparison measurement representing the similarity between the video and additional videos the user has viewed and uploaded.

51. The computer implemented method of claim 1, wherein a promoter requests to associate the video with the ad during creation of the ad.

52. A non-transitory computer-readable storage medium storing executable computer program instructions, comprising:
   instructions configured to maintain a video score for a video, the video score maintained based on one or more metrics representing user interactions received by a computer system from users that have viewed the video;
   instructions configured to identify an ad that is a candidate for presentation to a user, the ad associated with the video;
   instructions configured to calculate an ad score for the ad that represents a measurement of a likelihood that the user will be interested in the ad, the ad score calculated based at least in part on the video score of the video;
   instructions configured to choose to present the ad to the user based at least in part on the calculated ad score; and
   instructions configured to transmit the ad to a device configured to present the ad to the user responsive to choosing to present the ad.

* * * * *